UNITED STATES PATENT OFFICE.

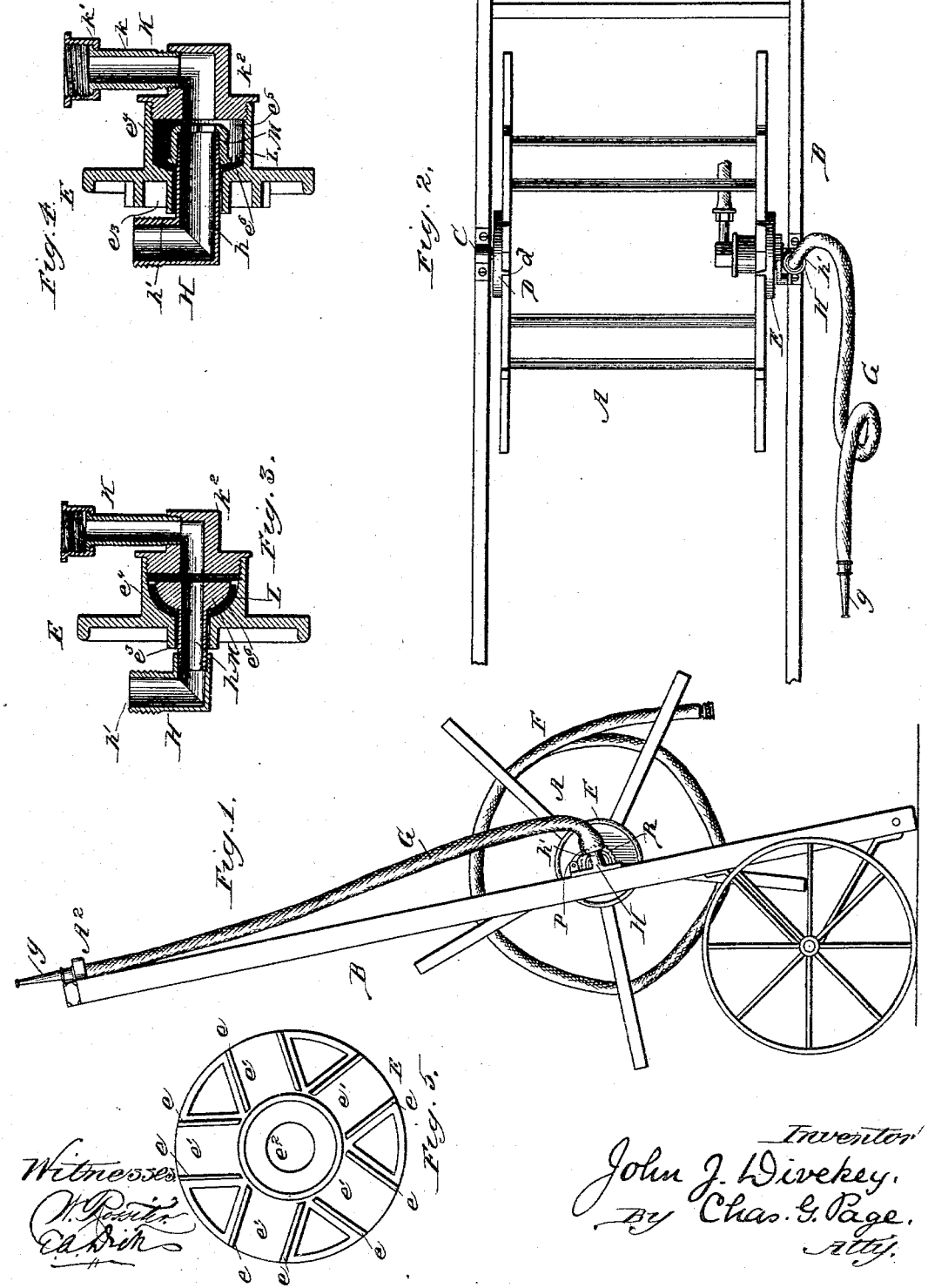

JOHN J. DIVEKEY, OF AURORA, ILLINOIS.

GARDEN-HOSE CARRIAGE.

SPECIFICATION forming part of Letters Patent No. 381,540, dated April 24, 1888.

Application filed August 17, 1887. Serial No. 247,163. (No model.)

*To all whom it may concern:*

Be it known that I, JOHN J. DIVEKEY, a citizen of the United States, residing at Aurora, in the county of Kane and State of Illinois, have invented certain new and useful Improvements in Garden-Hose Carriages, of which the following is a specification.

This invention relates to garden or lawn hose carriages, and is particularly designed as an improvement in garden-hose carriages wherein the receiving-hose that is to be attached to a plug or hydrant is arranged to be wound upon the reel.

The objects of my invention are to provide in the connection between the receiving and the discharge hose at one end of the reel a rotary or swivel joint which automatically tightens when the water is turned on and automatically loosens up when the water is turned off to avoid wear in and leakage of said joint, and to provide certain novel and improved details tending to simplify the construction and at the same time increase the efficiency of the structure.

To the attainment of the foregoing and other useful ends my invention consists in matters hereinafter described, and particularly pointed out in the claims.

In the drawings, Figure 1 represents in side elevation a garden-hose carriage with the receiving-hose wound upon the reel. Fig. 2 is a top plan view of the same, with the handle end of the body-frame broken away. Fig. 3 is an enlarged longitudinal central section through the rotary or swivel joint which serves to provide a pivot for one end of the reel and to connect together the receiving and the discharge hose. Fig. 4 is a view similar to Fig. 3, but showing a slight modification, hereinafter explained. Fig. 5 is an enlarged face view of the end reel-plate, E.

In said drawings, A indicates the hose-reel, which is mounted to turn upon the wheeled body-frame B. The hose-reel is pivotally supported at its ends, thereby dispensing with the necessity for an axle. At one end the said hose-reel is pivotally sustained by means of an end plate or hub, D, having a gudgeon or journal to turn in a suitable bearing, C, on the body-frame. The spokes at this end of the reel are secured to the hub D, which for such purpose is provided with a series of radial ribs, $d$, arranged similarly to the ribs $e$ of the opposite end hub, F, and affording between them suitable seating-spaces for the spokes. At its opposite end the reel is provided with a hub, E, having about its central body portion an annular flanged portion that is provided with a series of radially-disposed ribs, $e$, arranged to afford seating or bearing spaces $e'$ for the several end arms or spokes of the reel, it being observed that at both ends of the reel the end arms or spokes can be secured in their respectively allotted seats by bolts or rivets.

The hose F, that is to be carried upon and wound about the rotary reel A, has its outer end adapted for connection with a plug or the like and constitutes the receiving-hose, through which the water can be conducted from a plug or hydrant to the reel, and hence by unwinding the hose from the latter permit the reel to be moved about over the lawn or garden and temporarily stationed at variable distances from the plug or hydrant without severing the hose-connection between the two.

G indicates a short discharge-hose which is attached at one end upon the body-frame and at its opposite end provided with a discharge-nozzle, $g$.

Connection between the receiving-hose F and the discharge-hose G is established through a hollow journal and bearing at one end of the hose-reel, as follows: The hub E is provided with a centrally-arranged bore, $e^2$, Fig. 5, which is prolonged beyond the outer end of the hub by means of a neck, $e^3$, with which the hub is provided at one end. This neck $e^3$ provides an extension of the inner cylindric bearing-surface of the hub, which is arranged to turn upon the short horizontal arm of a bent pipe-joint, H, that is secured upon one of the side bars of the body-frame. The horizontal arm $h$ of said pipe-joint affords, therefore, a simple and convenient hollow bearing for the hub, while the short upright arm $h'$ of said tubular elbow-piece or bent pipe affords a connection for the discharge-hose G, which is at one end coupled to said hollow arm $h'$. The fixed pipe-joint H, to which the discharge-hose is coupled, has its passage in communication with the receiving-hose through the medium of a coupling, K, that is connected with the hub so as to turn therewith, but leave the hub not only free to turn upon the hollow bearing $h$, but also to be capable of a certain extent of end-play thereon for the purpose of affording a tight joint when the water is turned on, as will be hereinafter explained.

The coupling K comprises a nipple, $k$, having at one end a threaded neck, $k'$, or like device, for coupling it to the inner end of the receiving-hose. At its opposite end said nipple-tube $k$ is provided with a threaded nut or cap-piece, $k^2$, which is screwed to the end portion, $e^4$, of the hub E. The bore of the hub E is at one end expanded to provide a chamber, $e^5$, wherein the nut or base end $k^2$ of the nipple can be screwed up to an extent to provide a firm connection between the nipple and the hub.

The chamber $e^5$ also provides space for a packing, L, which is fitted around the tubular bearing $h$ at the point where said tubular bearing enters the chamber. The inner end of the chamber $e^5$ is made concave, so as to provide a rounded seat, $e^6$, for the packing L, which is held against said seat by a rounded nut or shoulder, M, on the end of the tubular bearing $h$ which terminates within the chamber $e^5$.

In Fig. 3 the end of the tubular bearing $h$ that is within the chamber is provided with a shoulder integral with the tubular bearing and rounded or convexed correspondingly to the concavity of the oppositely-arranged washer-seat, while in Fig. 4 this rounded shoulder is made separate from the hollow bearing, and hence conveniently formed as a nut which can be screwed upon threaded end of the hollow bearing $h$. By thus arranging the washer between surfaces respectively concave and convex an approximated ball-joint is attained and looseness or leakage from wear guarded against.

The reel is, as a whole, capable of an end-play to some extent, and the nut or shoulder on the tubular bearing $h$ is set relatively to the washer-seat $e^6$, so that when the water is turned on the pressure shall cause the washer to be tightly compressed between said two parts, and hence a tight joint afforded. As soon, however, as the water is turned off and the pressure thereby relieved said parts will relax their compressive action upon the washer, and thereby permit the reel to be turned easily and without subjecting the rotary joint to wear and tear.

When the shoulder M is made integral with the tubular bearing $h$, as in Fig. 3, said bearing will be made in two parts jointed together, so as to allow the disconnection of the several parts of the joint or the putting together of the same. When, however, the shoulder is formed by a nut such as at M, Fig. 4, such jointing of the tubular bearing $h$ will not be necessary. The wheeled body of the reel is desirably provided at one end with a cross-roller, A', for the receiving-hose to rest upon when the latter is run out from the reel, and at its opposite handle end said wheeled body-frame is desirably provided with some sort of a rest, A², for holding the free end of the discharge-hose when the latter is not in use. In order to lock the reel against rotation in one direction, I provide a pawl, P, pivoted on the body-frame and arranged to engage a circular ratchet, R, on one of the end plates of the reel.

What I claim as my invention is—

1. In a garden-hose carriage, a hub secured to one end of the reel and having the inner end portion of its bore expanded to form a chamber, $e^5$, combined with a pipe-joint, H, secured upon the body-frame and providing for one end of the reel a short pivot-support or journal, which is extended within the chamber in the hub and provided at its inner end with a shoulder, M, between which and the end of the chamber—that is, at the junction of the larger with the smaller portion of the bore of the hub—is placed a packing, the receiving-hose that is to be wound upon the reel being connected with the hub, and the discharge-hose being connected with the pipe-joint H, substantially as described.

2. In a garden-hose carriage, the combination, with the reel and wheeled body-frame, of a hub, E, secured to one end of the reel and having an expanded inner end portion of its bore forming a chamber, $e^5$, the pipe-joint H, secured to the body-frame and extending into the hub as a hollow bearing therefor, a shoulder, M, provided upon the inner end of the hollow bearing at a point within the chamber in the hub and having a rounded or convexed face formed opposite the end $e^4$ of the chamber, which said end is made concave in correspondence with the opposite face of the shoulder on the hollow bearing, and a packing placed between said faces, substantially as described.

3. The combination, with the reel and wheeled body-frame, of the hub E, secured to the reel and mounted upon a hollow short pivot or journal afforded by one end, $h$, of a pipe-joint, H, that is secured to the body-frame, the coupling K, having an end portion, $k^2$, screwed into an expanded portion, $e^5$, of the bore through the hub, and a shoulder, M, provided upon the hollow bearing at a point within the expanded portion of said bore of the hub, substantially as described.

JOHN J. DIVEKEY.

Witnesses:
ROSWELL W. GATES,
LEONARD RISING.